United States Patent [19]
Yen et al.

[11] Patent Number: 6,097,680
[45] Date of Patent: Aug. 1, 2000

[54] SPEED OF A COMPACT DISK DRIVE

[75] Inventors: Meng-Shin Yen, Taipei; Cheng-Chieh Ku, Taitung; Wai William Wang, Tao-Yunn, all of Taiwan

[73] Assignee: Acer Peripherals, Inc., Taoyuan, Taiwan

[21] Appl. No.: 09/087,346

[22] Filed: May 29, 1998

[30] Foreign Application Priority Data

Mar. 27, 1998 [TW] Taiwan .................................. 87104596

[51] Int. Cl.$^7$ ........................................................ G11B 7/00
[52] U.S. Cl. .............................. 369/50; 369/47; 369/44.32
[58] Field of Search .................................. 369/50, 47, 48, 369/49, 58, 59, 44.29, 44.28, 44.27, 44.32

[56] References Cited

U.S. PATENT DOCUMENTS 5,956,307  9/1999  Koudo et al. .............................. 369/50
5,995,460  11/1999  Takagi et al. .............................. 369/48

*Primary Examiner*—Muhammad Edun

[57] ABSTRACT

The present invention relates to a method for adjusting the rotating speed of a compact disc drive to prevent unwanted vibrations of a compact disc rotating within. The compact disc drive comprises a reading head for reading data stored in a track of the compact disc and generating a data signal and a track signal; a rotating driver for driving the compact disc; a speed control circuit for controlling the rotating speed of the rotating driver; a track driver for moving the reading head along a diameter of the compact disc; a track driving circuit for controlling the track driver; and a track servo circuit for controlling the track driving circuit according to the track signal generated by the reading head and a track correction gain so that the track driver can move the reading head along the diameter of the compact disc along its track. The speed adjustment method comprises the following steps:

(1) lowering the track correction gain to a predetermined value;
(2) using the speed control circuit to gradually increase the rotating speed of the rotating driver, and using a vibration detecting procedure to examine the track signal, determine whether a vibration occurs, and record the rotating speed at which the vibration occurs;
(3) if the vibration occurs, lowering the rotating speed of the compact disc drive to a level less than the speed at which the vibration occurs; and
(4) restoring the track correction gain.

6 Claims, 4 Drawing Sheets

SPEED OF A COMPACT DISK DRIVE

BACKGROUND OF THE INVENTION

1. Field of the Invention

The present invention relates to a method for adjusting rotating speed of a compact disc drive, and more particularly, to a method for adjusting the rotating speed of a compact disc drive such that vibrations of the rotating compact disc are prevented.

2. Description of the Prior Art

Please refer to FIG. 1. FIG. 1 is a diagrammatic view of a compact disc 10 with its weight unevenly distributed over its surface area. Manufacturing errors or unevenly distributed composition may cause a center of mass of the compact disc 10 to be deviated from its geographic center. If the mass of the compact disc 10 is m and the distance between its center of mass and its geographic center is r, a torque $$\tau = m \ast r$$

will be generated. When the compact disc 10 is rotated at an angular velocity w, a centrifugal force $$F = m \ast r \ast w^2$$

will be generated.

The centrifugal force F is directly proportional to the torque $\tau$ and the square of the angular velocity w of the compact disc 10. Thus, when rotating the compact disc 10 at a high speed, a strong centrifugal force will be generated even if the torque $\tau$ is small. Such a strong centrifugal force will cause the compact disc 10 to vibrate and which in turn, will cause a compact disc drive to vibrate with it. The vibrations will create bothering noise and prolong the time to read data from the compact disc 10.

SUMMARY OF THE INVENTION

It is therefore a primary objective of the present invention to provide a method for adjusting a rotating speed of a compact disc drive to solve the above mentioned problems.

In a preferred embodiment, the present invention relates to a speed adjustment method for adjusting the rotating speed of a compact disc drive such that vibrations of the rotating compact disc are prevented. The compact disc drive comprises:

- a reading head for reading data stored in a track of the compact disc and generating a data signal and a track signal;
- a rotating driver for driving the compact disc;
- a speed control circuit for controlling the rotating speed of the rotating driver;
- a track driver for moving the reading head along the diameter of the compact disc;
- a track driving circuit for controlling the track driver; and
- a track servo circuit for controlling the track driving circuit using the track signal generated by the reading head and a track correction gain so that the track driver can move the reading head along the diameter of the compact disc following its track.

The speed adjustment method comprises the following steps:

(1) lowering the track correction gain to a predetermined value;

(2) using the speed control circuit to gradually increase the rotating speed of the rotating driver, and using a vibration detecting procedure and the track signal to detect whether a vibration occurs and to record the rotating speed at which the vibration occurs;

(3) if the vibration occurs, lowering the rotating speed of the compact disc drive to a level less than the speed at which the vibration occurs; and (4) restoring the track correction gain.

It is an advantage of the present invention that the speed of the compact disc drive at which the vibration of the rotating compact disc starts to occur can be detected so that the compact disc drive can be set at a maximum speed at which vibrations will not occur.

This and other objectives of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
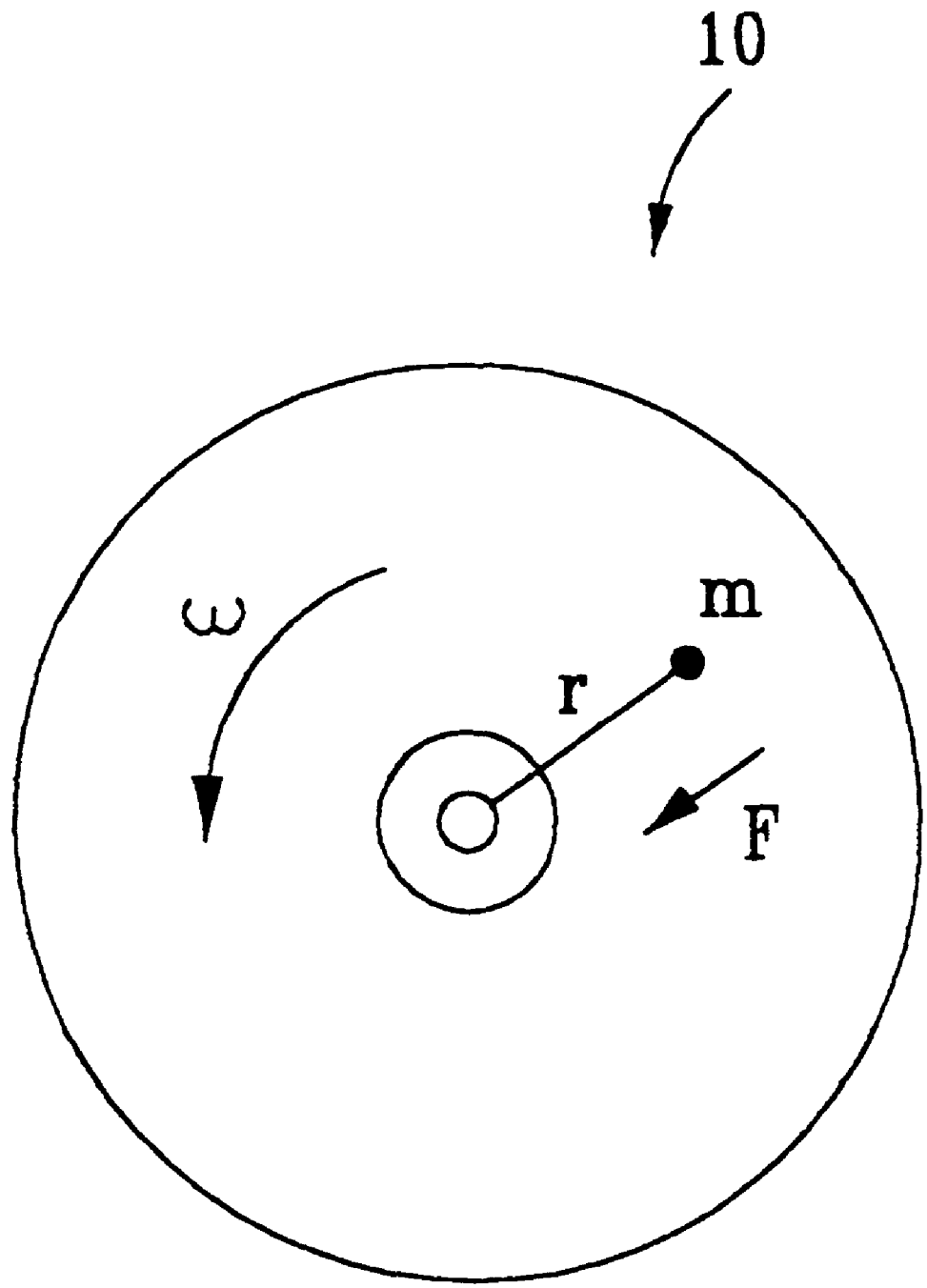
FIG. 1 is a diagrammatic view of a compact disc with its weight unevenly distributed over its surface area.
Figure 2:
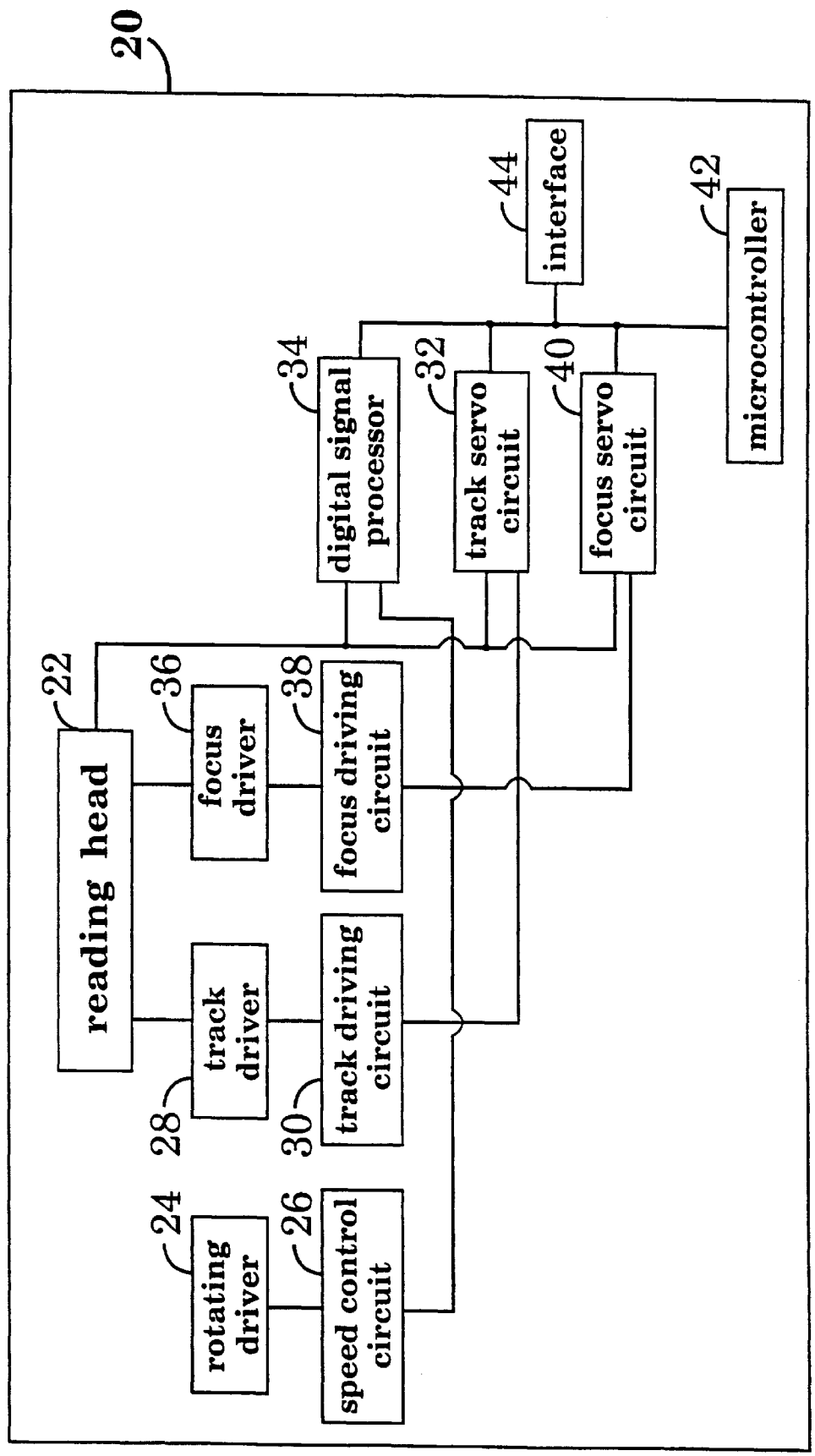
FIG. 2 is a function block diagram of a compact disc drive according to the present invention.

Please refer to FIG. 2. FIG. 2 is a function block diagram of a compact disc drive 20 according to the present invention. The compact disc drive 20 comprises a reading head 22 for reading data stored on a surface of a compact disc (not shown), and generating a data signal, a track signal, and a focus signal, a rotating driver 24 for driving the compact disc, a speed control circuit 26 for controlling a rotating speed of the rotating driver 24, a track driver 28 for moving the reading head 22 along a diameter of the compact disc, a track driving circuit 30 for controlling the track driver 28, a track servo circuit 32 for controlling the track driving circuit 30 according to the track signal generated by the reading head 22 and a track correction gain so that the track driver 28 can move the reading head 22 along the diameter of the compact disc following its track, a digital signal processor 34 for converting the data signal generated by the reading head 22 into a digital signal and controlling the rotating speed of the rotating driver 24 by using the speed control circuit 26, a focus driver 36 for moving a focus position of the reading head 22, a focus driving circuit 38 for controlling the focus driver 36, a focus servo circuit 40 for controlling the focus driving circuit 38 according to the focus signal so that the focus driver 36 can maintain the reading head 22 to stay focused while moving along the track of the compact disc, an interface 44 for connecting with a computer, and a microcontroller 42 for controlling operations of the compact disc drive 20.

Figure 3:
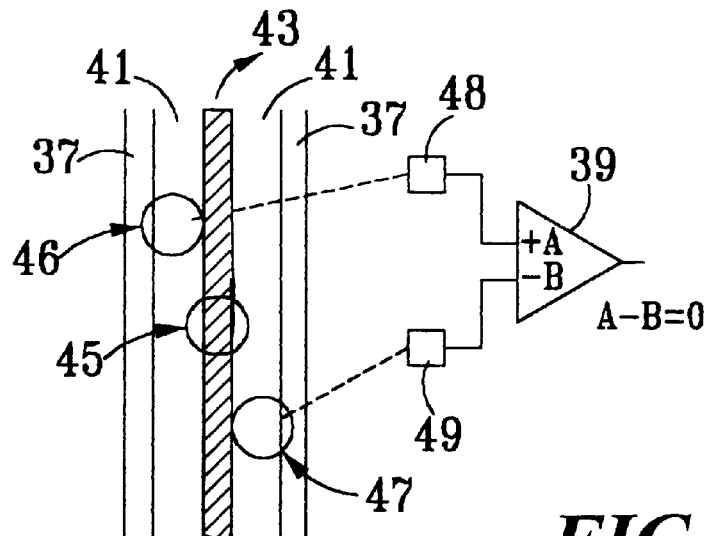
FIG. 3 to FIG. 5 show a method of detecting a track deviation of the reading head shown in FIG. 2 from a track position.
Figure 4:
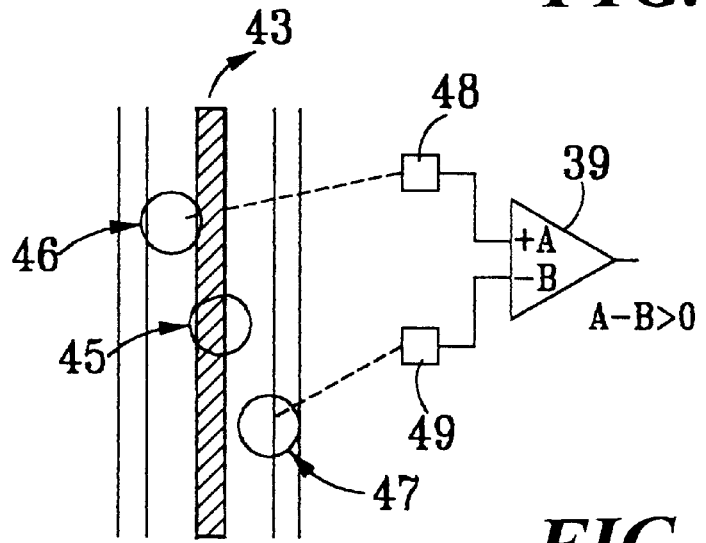
Figure 5:
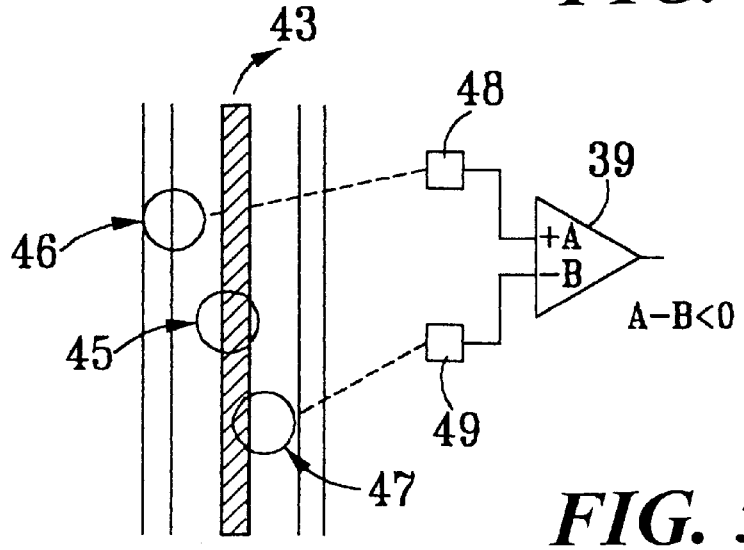

Please refer to FIG. 3 to FIG. 5. FIG. 3 to FIG. 5 show a method of detecting a track deviation of the reading head 22 from a track position 43 by using three light beams 45, 46, 47. When a compact disc with its weight unevenly distributed over its surface area is rotated, a centrifugal force will be generated causing the compact disc to vibrate mostly along a horizontal direction. This vibration along the horizontal direction will cause the reading head 22 to deviate from its track position 43. The deviations of the reading head 22 can then be detected.

FIG. 3 shows that when the reading head 22 reads data, it will generate three light beams around a track position 43 of the compact disc. The two sides of the track position 43 are two flat surfaces 41 and two concave surfaces 37. The light beam projected on the track position 43 is a primary light beam 45 emitted for reading data stored on the track position 43, the other two light beams positioned at two sides of the primary light beam 45 are auxiliary light beams 46 and 47 emitted for detecting deviation of the reading head 22 from the track position 43. The reading head 22 further comprises two sensors 48 and 49 separately installed for detecting the light reflected by the auxiliary light beams 46 and 47, and an amplifier 39 electrically connected to output ports of the sensors 48 and 49 for generating track signals.

FIG. 3 shows that the primary light beam 45 is projected on the center of the track position 43, and the auxiliary light beams 46 and 47 are symmetrically projected on the flat surfaces 41 beside the track position 43. Because the light beams reflected by the auxiliary light beams 46 and 47 are of equal intensity, the sensors 48 and 49 will detect the same brightness levels A and B, and the track signal outputted by the amplifier 39 will be A−B=0 indicating that the reading head 22 is currently moving unbiased along the track position 43. FIG. 4 shows that the reading head 22 has shifted toward a right side of the track position 43, thus the amplifier 39 will output a track signal A−B>0 indicating a right side deviation. FIG. 5 shows that the reading head 22 has shifted toward a left side of the track position 43, thus the amplifier 39 will output a track signal A−B<0 indicating a left side deviation. When an amplitude of the track signal generated by the amplifier 39 exceeds a predetermined threshold, the track servo circuit 32 will generate a deviation signal to indicate a track deviation of the reading head 22. In the present invention, a total number of deviation signals generated within a predetermined time period at a constant rotating speed is used by the microcontroller 42 to identify whether a vibration has occurred at a given rotating speed of the compact disc.

As per the above vibration detecting method, the present invention provides a rotating speed adjustment method for a compact disc drive 20 to prevent unwanted compact disc vibrations. The rotating speed adjustment method comprises the following steps:

(1) reducing the track correction gain of the track servo circuit 32 to a predetermined value for reducing the ability of the reading head 22 from correcting its position along the diameter to follow the track;
(2) using the speed control circuit 26 to gradually increase the rotating speed of the rotating driver 24 from a lower rotating speed, and using the track signals generated by the track servo circuit 32 and a vibration detecting procedure to detect whether a vibration has occurred and to record the rotating speed at which the vibration occurs;
(3) if vibration has occurred, lowering the rotating speed of the compact disc drive 20 to a level less than the speed at which the vibration occurs;
(4) restoring the track correction gain of the track servo circuit 32.

In step (1), the track correction gain of the track servo circuit 32 is reduced because the effectiveness of the reading head 22 to correct its diametric position is dependent on the track correction gain of the track servo circuit 32. A greater track correction gain makes the reading head 22 more able to correct itself from a track deviation, and thus improves the reading head's efficiency in reading data from the track position 43. A high speed compact disc drive is usually preset with a high track correction gain, so that its reading head 22 can quickly restore its diametric position when deviated from the track position. The high track correction gain allows the reading head 22 to stay on the track and continue to read data from it even when the compact disc vibrates. However, the microcontroller 42 has to be able to use the track servo circuit 32 to detect a track deviation whenever the compact disc vibrates. If the track servo circuit 32 has an effective track correction gain, the reading head 22 will be corrected to the track position 43 by the track servo circuit 32 before the amplitude of the track signal generated by the amplifier 39 of the reading head 22 exceeds the predetermined threshold, thus the microcontroller 42 can never detect the occurrence of a vibration. When the track correction gain of the track servo circuit 32 is reduced, it becomes very difficult for the reading head 22 to restore its track position quickly. Therefore, before the reading head 22 is corrected to the track position 43, the track signal generated by the amplifier 39 of the reading head 22 will exceed the predetermined threshold when a vibration occurs, and the track servo circuit 32 will generate a deviation signal. The deviation signals will be added up for determining whether a vibration has actually occurred.

Figure 6:
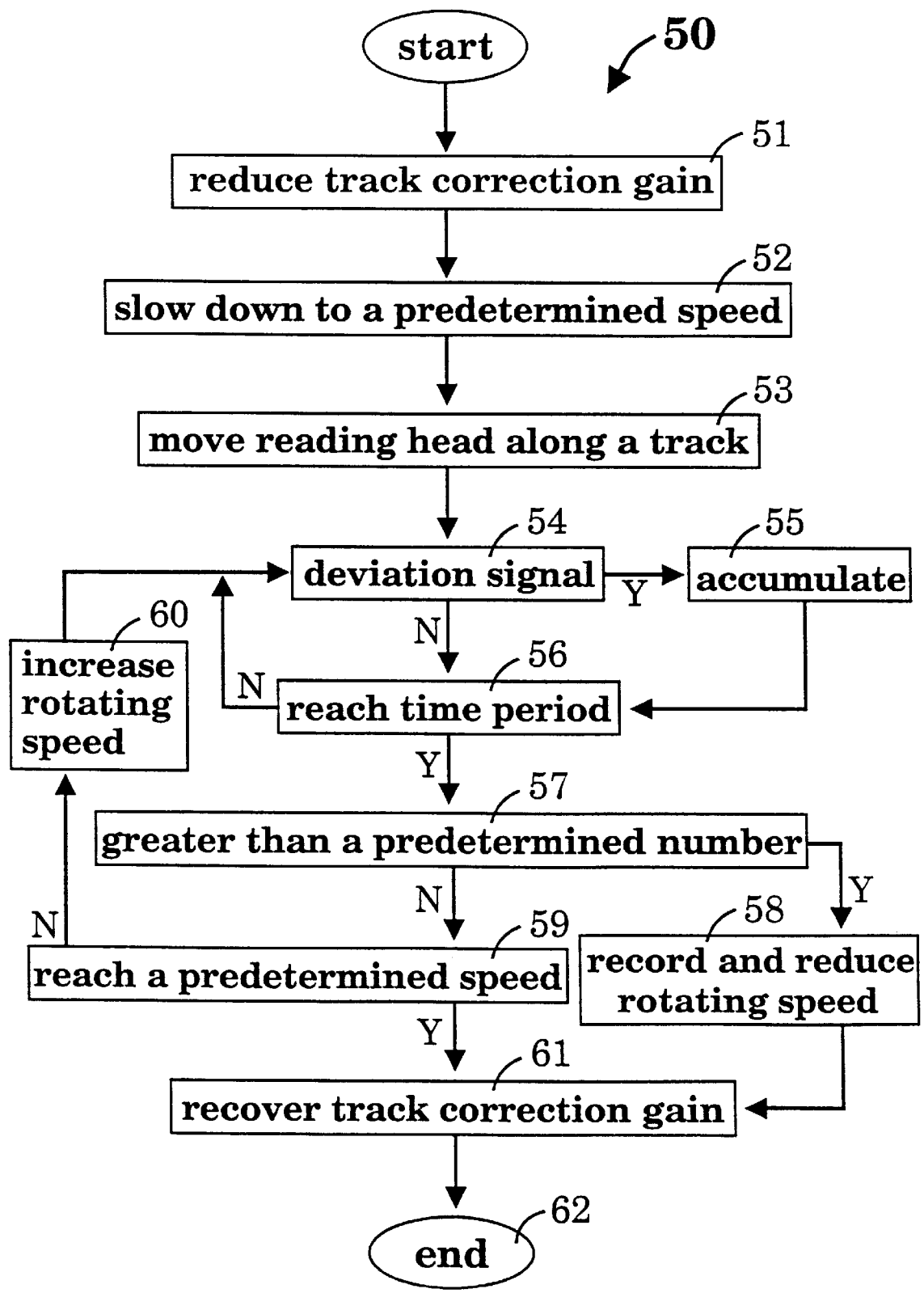
FIG. 6 is a speed adjustment method executed by the microcontroller shown in FIG. 2 for adjusting the rotating speed of the compact disc drive according to the present invention.

Please refer to FIG. 6. FIG. 6 is a speed adjustment method 50 executed by the microcontroller 42 for adjusting the rotating speed of the compact disc. The procedure 50 comprises the following steps:

step 51: reduce the track correction gain to a predetermined value such as 50% of normal track correction gain;
step 52: use the digital signal processor 34 to lower the rotating speed of the rotating driver 24 to a predetermined value such as 70% of normal rotating speed;
step 53: move the reading head 22 to a track, start to move the reading head 22 along the track, and start to count test time;
step 54: check if the track servo circuit 32 has generated any deviation signals; if not, go to step 56;
step 55: accumulate the number of deviation signals;
step 56: check if the test time has reached a predetermined time period; if not, go to step 54;
step 57: check if the number of the deviation signals is greater than a predetermined number; if not, go to step 59;
step 58: record the current rotating speed and use the digital signal processor 34 to set the rotating speed of the rotating driver 24 less than the current rotating speed; go to step 61;
step 59: check if the rotating speed has reached a predetermined value such as the highest rotating speed of the rotating driver 24; if yes, go to step 61;
step 60: increase the rotating speed by a fixed value, restart to count the test time, and go to step 54;
step 61: recover the track correction gain;
step 62: end.

Steps 54 to 57 outlines a vibration detecting procedure. The number of deviation signals generated within a predetermined period such as 1 second is counted in steps 54 to 56, and the counted number is compared with a predetermined number such as 10 in step 57 thereby deviation signals generated by reasons other than the compact disc itself will be ignored, and misjudgments of the compact disc as having vibrations by the compact disc drive 20 will be avoided.

The speed adjustment method 50 can be executed when starting to rotate a compact disc. It will detect the rotating speed at which a vibration of the compact disc with unevenly distributed weight would occur. The rotating speed of the compact disc drive 20 can then be adjusted to a maximum speed at which the vibration would not occur when the reading head 22 reads data from the compact disc.

Those skilled in the art will readily observe that numerous modifications and alternations of the device may be made while retaining the teachings of the invention. Accordingly, the above disclosure should by construed as limited only by the metes and bounds of the appended claims.

What is claimed is:

1. A speed adjustment method for adjusting a rotating speed of a compact disc drive to prevent vibrations of a compact disc rotating in the compact disc drive, the compact disc drive comprising:

a reading head for reading data stored in a track of the compact disc and generating a data signal and a track signal;

a rotating driver for rotating the compact disc;

a speed control circuit for controlling the rotating speed of the rotating driver;

a track driver for moving the reading head along a diameter of the compact disc;

a track driving circuit for controlling the track driver; and a track servo circuit for controlling the track driving circuit using the track signal generated by the reading head according to a track correction gain so that the track driver can move the reading head along the diameter of the compact disc to follow the track;

the speed adjustment method comprising:

(1) lowering the track correction gain to a predetermined value;

(2) using the speed control circuit to gradually increase the rotating speed of the rotating driver, and using a vibration detecting procedure to examine the track signal, determine whether a vibration occurs, and record the rotating speed at which the vibration occurs;

(3) if the vibration occurs, lowering the rotating speed of the compact disc drive to a value less than the speed at which the vibration occurs;

(4) restoring the track correction gain.

2. The speed adjustment method of claim 1 wherein the track servo circuit will generate a deviation signal according to the track signal, and the vibration detecting procedure will use the deviation signal to determine whether a vibration occurs.

3. The speed adjustment method of claim 2 wherein when an amplitude of the track signal exceeds a predetermined threshold, the track servo circuit will generate the deviation signal.

4. The speed adjustment method of claim 2 wherein the vibration detecting procedure determines whether a vibration occurs by counting the number of deviation signals generated within a predetermined time period when the compact disc drive is rotated at a specific speed.

5. The speed adjustment method of claim 1 wherein the compact disc drive further comprises a digital signal processor for converting the data signal generated by the reading head into a digital signal, and controlling the rotating speed of rotating driver through the speed control circuit.

6. The speed adjustment method of claim 1 wherein when reading data from the track of the compact disc, the reading head will also generate a focus signal, and the compact disc drive further comprises:

a focus driver for moving a focus position of the reading head;

a focus driving circuit for controlling the focus driver; and a focus servo circuit for controlling the focus driving circuit according to the focus signal so that the focus driver can maintain the reading head focused to the track of the compact disc.

* * * * *